United States Patent [19]

Cyb

[11] Patent Number: 5,014,903
[45] Date of Patent: May 14, 1991

[54] HEAT-RETAINING EXHAUST COMPONENTS AND METHOD OF PREPARING SAME

[76] Inventor: Frederick F. Cyb, 23351 Filmore, Taylor, Mich. 48180

[21] Appl. No.: 512,077

[22] Filed: Apr. 12, 1990

Related U.S. Application Data

[63] Continuation of Ser. No. 350,336, May 11, 1989, abandoned, Continuation-in-part of Ser. No. 275,949, Nov. 25, 1988, Pat. No. 4,930,678.

[51] Int. Cl.$^5$ .......................... F01N 7/10; B23K 31/00
[52] U.S. Cl. ...................................... 228/176; 228/261; 228/902; 228/175; 228/182; 60/323
[58] Field of Search .............. 228/182, 203, 261, 902, 228/175, 176; 60/323, 302; 164/98, 46

[56] References Cited

U.S. PATENT DOCUMENTS

| | | | |
|---|---|---|---|
| 2,848,349 | 8/1958 | Rechter et al. | . |
| 3,043,094 | 7/1962 | Nichols | . |
| 3,082,752 | 3/1963 | Thomas | 123/668 |
| 3,173,451 | 3/1965 | Slayter | 164/98 |
| 3,233,697 | 2/1966 | Slayter et al. | 181/245 |
| 3,283,847 | 11/1966 | Kerns | . |
| 3,488,723 | 1/1970 | Veazie | 60/323 |
| 3,568,723 | 3/1971 | Sowards | 164/98 |
| 3,640,755 | 2/1972 | Barth | . |
| 3,718,172 | 2/1973 | Rice et al. | 164/98 |
| 3,838,495 | 10/1974 | Kuhnert | 29/458 |
| 4,055,705 | 10/1977 | Stacura et al. | . |
| 4,074,671 | 2/1978 | Pennila | 123/668 |
| 4,113,167 | 9/1978 | Komiyama et al. | 228/176 |
| 4,182,122 | 1/1980 | Stratton et al. | 164/98 |
| 4,248,940 | 2/1981 | Goward et al. | . |
| 4,373,331 | 2/1983 | Santiago et al. | 60/323 |
| 4,537,027 | 8/1985 | Harwood et al. | . |
| 4,612,880 | 9/1986 | Brass et al. | 123/669 |
| 4,674,594 | 6/1987 | Jensen | 181/243 |
| 4,680,239 | 7/1987 | Yano et al. | . |
| 4,689,952 | 9/1987 | Arthur et al. | . |
| 4,861,618 | 8/1989 | Vine et al. | . |
| 4,890,663 | 1/1990 | Yarahmadi | 164/98 |

FOREIGN PATENT DOCUMENTS 3622301  1/1988  Fed. Rep. of Germany ...... 123/668

*Primary Examiner*—Sam Heinrich
*Attorney, Agent, or Firm*—Weintraub, DuRoss & Brady

[57] ABSTRACT

A method lining a component of a vehicle which may contact exhaust gases is disclosed, including the steps of applying a thin layer of a heat-resistant compound to an inner surface of the component to form a liner therein and bonding the liner to the surface. The manifold may be in two or more sections when the compound is applied and the sections may subsequently be joined together to form the component. The compound may contain zirconium and/or may be a ceramic material.

17 Claims, 1 Drawing Sheet

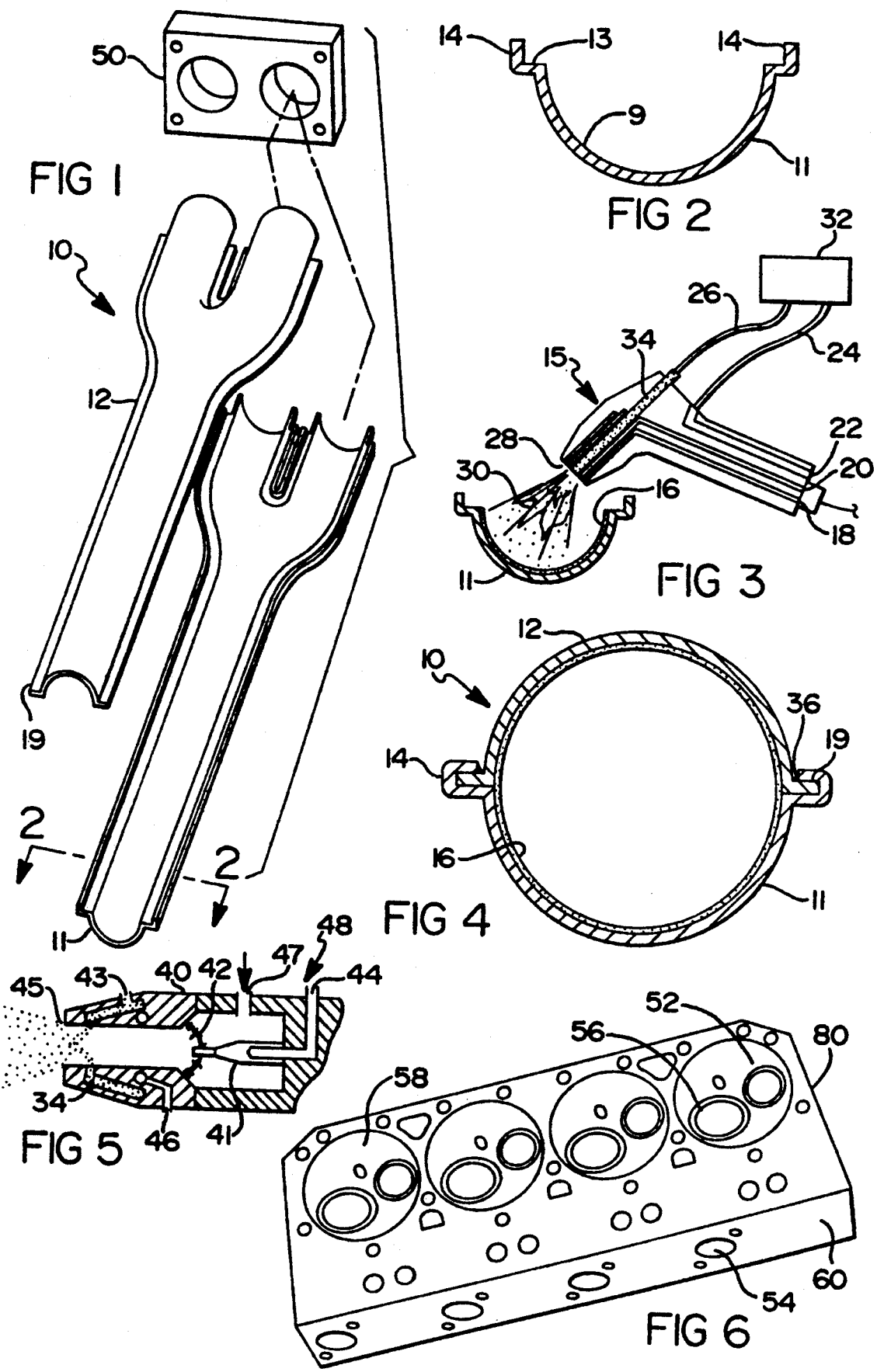

HEAT-RETAINING EXHAUST COMPONENTS AND METHOD OF PREPARING SAME

CROSS-REFERENCE TO RELATED APPLICATION

The present application is a continuation of U.S. patent application Ser. No. 07/350,336, filed May 11, 1989, now abandoned, which is a continuation-in-part of U.S. patent application Ser. No. 275,949 filed Nov. 25, 1988, entitled "Heat-Resistant Exhaust Manifold and Method of Preparing Same" now issued as U.S. Pat. No. 4,930,678, the disclosure of which is hereby incorporated by reference.

BACKGROUND OF THE INVENTION

1. Field of the Invention

The present invention relates to heat-retaining exhaust components and methods of preparing such components. More particularly, the present invention relates to a method of lining a two-piece exhaust pipe or an automotive cylinder head with a heat-resistant compound containing zirconium, a ceramic material, or both, and a heat-retaining component which is the product of the described process.

2. Prior Art

In the automotive industry, it has long been recognized that heat generated by the combustion process emanating from hot vehicle components into the engine compartment of a vehicle is a problem. Not only does such heat degrade the various other components in the engine compartment which are not heat resistant, but the heat also causes the hot components themselves to become brittle and deteriorate. The problem is exacerbated in today's smaller engine compartments since cars are being "down-sized", especially when a high-performance engine such as a turbocharged or supercharged engine is packed tightly into such a small engine compartment. Heat generation in engine compartments is not limited to such high-performance engines, however. Heat loss is particularly a problem with any component which comes into contact with hot engine exhaust, such as vehicle cylinder heads, exhaust manifolds, and exhaust piping.

Many varied types of heat shields and insulation have been employed in prior attempts to alleviate this problem. Ongoing efforts continue to channel the maximum possible amount of heat, which has been generated in the combustion chambers, from the exhaust ports of the cylinder heads into and through the exhaust system, minimizing the amount which is released in the engine compartment.

Another important reason for wishing to channel the maximum amount of heat possible through the exhaust system is that by retaining heat in the exhaust system, "light off" of the catalytic converter may be achieved sooner if more heat is conveyed directly to the converter rather than dissipated outwardly. This promotes greater fuel efficiency as well as lowered exhaust emissions, which are both high priorities in today's market.

For all of the above listed reasons, it is desirable to retain heat within components which contact engine exhaust.

SUMMARY OF THE INVENTION

The present invention provides a method of lining a component of a vehicle which may contact exhaust gases, comprising the steps of:

(a) applying a thin layer of a heat-resistant compound to an inner surface of the component to form a liner therein; and (b) bonding the compound to the surface.

The component may be an exhaust pipe which may be in two or more sections when the compound is applied thereto, and the sections may be welded or otherwise joined together after the compound has been bonded thereto. Alternatively, the component may be a cylinder head.

The compound may be applied in a molten state and may be bonded to the component by the application of heat thereto. The compound may be a ceramic material, may contain zirconium, or may contain both of these. Zirconium is a preferred component because of its high heat resistance.

The application of the compound and the heat bonding may be performed substantially simultaneously. The surface to be coated may be treated to roughen the surface before the compound is applied, and in one embodiment the compound is applied in a layer about 10 to about 15 thousands of an inch in thickness.

The present invention also encompasses a heat-retaining exhaust pipe or cylinder head which is prepared by the process of the present invention.

Further detail regarding preferred embodiments of the present invention may be found in the detailed description section. Throughout the following description and in the drawings, identical reference numbers are used to refer to the same component shown in multiple figures of the drawings, in which:

BRIEF DESCRIPTION OF THE DRAWINGS

FIG. 1 is an exploded perspective view of of a two-part exhaust pipe and flange in accordance with the present invention;

FIG. 2 is a cross-sectional view of the lower section of the pipe of FIG. 1; taken along the line 2—2;

FIG. 3 is a view similar to FIG. 2 showing a heat-resistant compound being applied to the interior of the pipe section;

FIG. 4 is a cross-sectional view of the assembled pipe showing a liner formed of heat-resistant material on the inside thereof, FIG. 5 is a cross-sectional view of the head of a plasma-arc spray gun, partially cut away; and FIG. 6 is a perspective view of a cylinder head in accordance with the present invention.

DETAILED DESCRIPTION OF THE PREFERRED EMBODIMENT

The above-mentioned copending parent application discloses a heat-resistant exhaust manifold which includes a liner formed of a heat-resistant material bonded to the interior of a sheet metal manifold. The manifold is formed in multiple parts for better access to the interior surface thereof.

The present invention expands on the basic concept set out in the parent application. It is desirable to keep as much exhaust heat within an automotive exhaust system between the point of combustion and the catalytic converter, for the reasons set out in the foregoing description of the prior art. It would therefore be advantageous to line other vehicle components that come into contact with exhaust gases, in addition to lining the exhaust manifold as disclosed in the parent application hereof. The present disclosure thus describes a process for lining additional components which contact hot exhaust gases.

Referring to FIG. 1, two sections 11, 12 of an exhaust pipe 10 are illustrated, along with a flange 50 for attaching the pipe 10 to an exhaust manifold (not shown).

The flange 50 may be added to the exhaust pipe 10 once a heat resistant compound has been bonded thereto and the component parts 11, 12 have been joined together as further described herein. The flange 50 or other additional components such as hangers, brackets, etc. known to those in the art may be attached to the pipe body by laser welding, tig welding, or other suitable method.

The exhaust pipe 10 comprises a lower section 11 which is a first sheet metal shell. The pipe 10 also includes an upper section 12 which is a second sheet metal shell. The first and second sections 11, 12 are alignable, as shown.

As shown in FIG. 2, the lower section 11 has a horizontal ridge 13 and a vertical ridge 14 formed on each side thereof, the vertical ridges 14 extending upwardly from the horizontal ridges 13 for joining the sections 11, 12 together as will be described herein.

Referring to FIG. 3, a metal spraying gun 15 is illustrated in cross-section, for applying a thin heat-resistant layer to the inside of the shell 11 to form a liner 16 on the inside thereof. In a metal spraying application a suitable fuel mixture, such as hydrogen, acetylene, or acetylene and oxygen is fed into a fuel inlet 20 of the metal-spraying gun 15 from a fuel source (not shown). Air or oxygen under pressure is fed into an air port 18 of the gun 15, and mixes with the fuel at the outlet 28 of the gun. The fuel is ignited to form a flame front 30 at the outlet of the gun.

Drive air under pressure is applied to a drive air port 22 and passes through a drive air conduit 24 to force a compound 34 in the form of a powder out from a reservoir 32 and into a powder conduit 26 and thence into the gun 15. The compound 34 is sprayed outwardly from the gun in a conical pattern and is bonded to the inside of the sheet metal shell 11 to form a first liner 16 on the inside thereof.

The interior surface 9 of the sheet metal shell 11 may be roughened beforehand to promote bonding of the compound 34 to the surface 9, and this roughening of the surface 9 may be accomplished by sandblasting, machining, or other appropriate method. Alternatively, any appropriate adhesive may be applied to the inner surface 9 of the sheet metal shell 11 to promote bonding of the compound 34 to the inside surface 9 of the sheet metal shell 11.

As seen in FIG. 5, an alternate means of applying the compound 34 to the sheet metal shells is achieved using the technique of plasma-arc spraying. In plasma-arc spraying, a generally inert gas such as nitrogen or argon is fed into a plasma spray gun 48 at a gas inlet 47 and passed between two electrodes 40, 41 where it is ionized by a continuous high voltage arc 42 passing between the electrodes. This ionizes the gas and forms it into a plasma capable of attaining temperatures of 20,000° F. or more. The electrodes 40, 41 are normally liquid cooled by cooling ports 46, 44 respectively to prolong their life. A powder 34 which is used to form the heat-resistant liner 16 is fed into the gun 48 at a powder inlet 43 and enters the plasma downstream of the arc 42, where the powder 34 is melted by the plasma and is caught up therein and sprayed from the outlet 45 of the gun 48 and applied to the inside of the pipe sections 11, 12. Plasma-arc spraying is relatively well known and understood in the art.

The compound 34 which is used to form the liner may contain zirconium, may be a metallic alloy or a ceramic material or may be a powdered glassy compound such as zircon. These compounds are used because of their known heat-resistant properties. In a first embodiment a zirconium-containing compound is preferred. In a second embodiment a ceramic compound is preferred. The liner 16 may be bonded to the interior 9 of the sheet metal shell 11 by the application of heat thereto. While the thickness of the liner 16 is not critical to the present invention, a thickness of about 0.010 inches to about 0.015 inches has been found to be helpful in promoting heat-resistance in the finished exhaust component.

The upper section 12 of the pipe 10 is treated in a similar fashion to that described herein for the lower section, and the gun 15 or 48 is used to spray a thin layer of the heat-resistant compound 34 on the inside thereof, which is bonded to the shell 12 to form a similar liner.

Referring to FIG. 4, a cross-sectional view of part of an assembled exhaust pipe 10 is illustrated with the upper section 12 joined to the lower section 11. The vertical ribs 14 of the lower section 11 are bent in a die (not shown) in two operations and clamped around horizontal ridges 19 of the upper section 12 and may be welded thereto as at 36 to insure that exhaust gas will not leak out of the pipe 10 at the seams proximate the ridges 14. The ridges 14 thus provide a means for securing the upper section 12 to the lower section 11 in the aligned configuration. Alternative methods of joining the two sections 11, 12 may be used, as will be appreciated by those skilled in the art. The flange 50 is added on as shown in FIG. 1 after the upper and lower sections 12, 11 are joined together. The method of the present invention for lining a component of a vehicle which may be contacted by exhaust gases of an engine in the vehicle is also appropriate for lining portions of a vehicle cylinder head such as that shown at 80 in FIG. 6. A metal spraying gun 15 or a plasma arc spray gun 48 as described herein before may be used to apply a thin layer of a heat-resistant compound 34 which comprises, e.g., zirconium, a ceramic material, or both of these, to an inner surface of the cylinder head 80 to form a liner 58 therein, and the liner 58 is preferably bonded thereto during application of the compound 34. Surfaces of a vehicle cylinder head which are appropriate for the application of such a liner 58 include the combustion chambers 52 and the exhaust ports 54 extending through the cylinder head 50 from the exhaust valve seats 56 to join up with an exhaust manifold (not shown) at an edge 60 of the cylinder head 50.

This lining of various components of a vehicle which may come into contact with exhaust gases tends to retain exhaust heat from the combustion process within the exhaust system and maximizes the amount of heat received at a catalytic converter to promote two important goals, firstly, to maximize fuel economy, and secondly, to minimize harmful vehicle emissions. This serves to promote conservation of resources and protection of the environment.

The foregoing description is intended to be illustrative, and not restrictive. Many modifications of the present invention will occur to those skilled in the art. All such modifications within the scope of the appended claims are intended to be within the scope and spirit of the present invention.

Having, thus, described the invention, what is claimed is:

1. A method of lining a component of a vehicular exhaust system to render the component resistant to dissipation of heat therethrough, comprising the steps of:
    (a) providing a first metal shell which is a first section of the exhaust system component, the shell having an inner surface and an outer surface;
    (b) applying a thin layer of a heat-resistant compound to the inner surface of the first shell to form a first liner therein, the liner being substantially free of void spaces therewithin;
    (c) bonding the first liner to the first shell;
    (d) providing a second metal shell which is a second section of the exhaust system component, the second shell having an inner surface and an outer surface, the second shell being alignable with the first shell;
    (e) applying a thin layer of a heat-resistant compound to the inner surface of the second shell to form a second liner therein, the second liner being substantially free of void spaces therewithin;
    (f) bonding the second liner to the second shell; and
    (g) joining the first and second shells together in an aligned configuration.

2. The method of claim 1, wherein the component is an exhaust pipe.

3. The method of claim 1, wherein the compound comprises a ceramic material.

4. The method of claim 1, wherein the compound comprises zirconium.

5. The method of claim 1, wherein the liner is about 0.010 inches to about 0.015 inches in thickness.

6. The method of claim 1, wherein the bonding is accomplished by the application of heat to the liner.

7. A method of lining an exhaust pipe, comprising the steps of:
    (a) applying a heat-resistant compound to form a first liner on the inside of a first sheet metal shell, the first shell comprising a first section of an exhaust pipe;
    (b) bonding the first liner to the first shell;
    (c) applying a heat-resistant compound to form a second liner on the inside of a second sheet metal shell, the second shell comprising a second section of the exhaust pipe and being alignable with the first section;
    (d) bonding the second liner to the second shell; and then
    (e) joining the first and second shells together in an aligned configuration.

8. The method of claim 9, wherein the compound is applied in a molten condition.

9. The method of claim 10, wherein the compound is applied by plasma-arc spraying.

10. The method of claim 9, wherein, the liners comprise a ceramic material.

11. The method of claim 9, wherein the liners comprise zirconium.

12. A heat-retaining exhaust pipe which is a product of a method which comprises the steps of:
    (a) applying a heat-resistant compound to form a first liner on the inside of a first sheet-metal shell, the first shell comprising a first section of the exhaust pipe;
    (b) adhesively bonding the first liner to the inside of the first sheet-metal shell;
    (c) applying a heat-resistant compound to form a second liner on the inside of a second sheet metal shell, the second shell comprising a second section of the exhaust pipe; the second shell being alignable with the first shell;
    (d) adhesively bonding the second liner to the inside of the second sheet-metal shell; and then
    (e) joining the first and second shells together in an aligned configuration.

13. A heat-retaining exhaust pipe, comprising;
    (a) a first half of a pipe body formed in a sheet metal shell;
    (b) a second half of a pipe body formed in a sheet metal shell and being alignable with the first half;
    (c) a thin liner for each of the first and second halves, each of the liners being adhesively bonded to the respective halves; and
    (d) means for securing the first and second halves together in an aligned configuration.

14. The exhaust pipe of claim 13, wherein the liners comprise zirconium.

15. The exhaust pipe of claim 13, wherein the liners comprise a ceramic material.

16. The exhaust pipe of claim 13, wherein the liners are a product of a process which comprises plasma-arc spraying.

17. A method of lining a component of a vehicular exhaust system to render the component resistant to dissipation of heat therethrough, comprising the steps of;
    (a) providing a first metal shell which is a first section of the exhaust system component, the shell having an inner surface and an outer surface;
    (b) applying a thin layer of a heat-resistant compound to the inner surface of the first shell to form a first liner therein;
    (c) bonding the first liner to the first shell;
    (d) providing a second metal shell which is a second section of the exhaust system component, the second shell having an inner surface and an outer surface, the second shell being alignable with the first shell;
    (e) applying a thin layer of a heat-resistant compound to the inner surface of the second shell to form a second liner therein;
    (f) bonding the second liner to the second shell; and
    (g) joining the first and second shells together in an aligned configuration.

* * * * *